Figure 1:
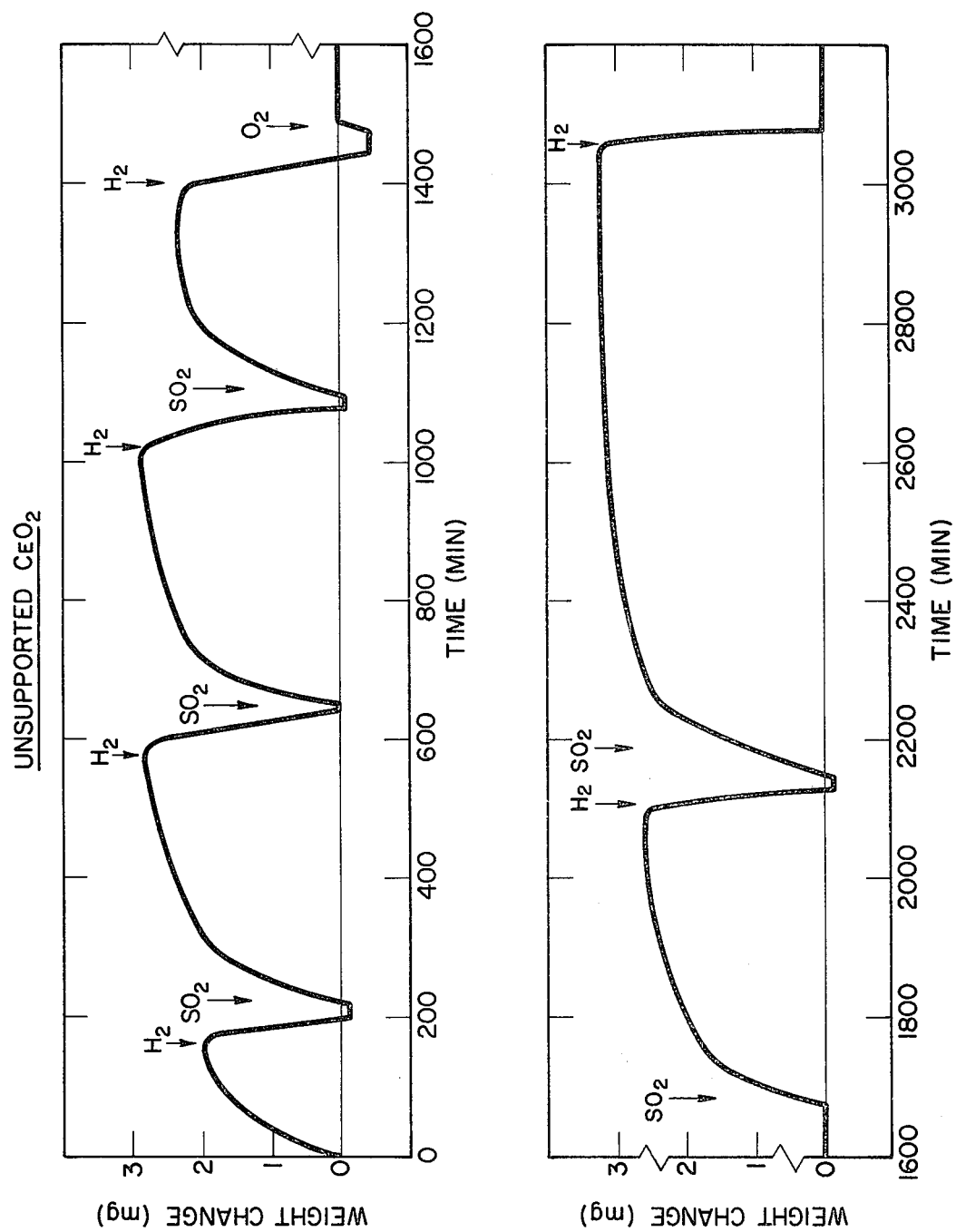

United States Patent [19]

Longo

[11] B 4,001,375

[45] Jan. 4, 1977

[54] PROCESS FOR THE DESULFURIZATION OF FLUE GAS

[75] Inventor: John M. Longo, New Providence, N.J.

[73] Assignee: Exxon Research & Engineering Co., Linden, N.J.

[22] Filed: Aug. 21, 1974

[21] Appl. No.: 499,324

[44] Published under the second Trial Voluntary Protest Program on March 16, 1976 as document No. B 499,324.

[52] U.S. Cl. .............................. 423/244; 423/563
[51] Int. Cl.$^2$ ..................... C01B 7/00; B01J 8/00
[58] Field of Search .......................... 423/242–244, 423/563

[56] References Cited
FOREIGN PATENTS OR APPLICATIONS

| 1,154,008 | 6/1969 | United Kingdom | 423/244 |
| 903,612 | 8/1962 | United Kingdom | 423/244 |

OTHER PUBLICATIONS

Lowell et al., Selection of Metal Oxides for Removing $SO_2$ from Flue Gas, Ind. Eng. Chemical Process Design, Development, vol. 10, No. 3, 1971.

*Primary Examiner*—Oscar R. Vertiz
*Assistant Examiner*—Gregory A. Heller
*Attorney, Agent, or Firm*—Robert J. Baran; Joseph J. Allocca

[57] ABSTRACT

The instant invention relates to a process for the removal of sulfur oxides from gases which comprises the steps of contacting the gas with a cerium oxide sorbent at conditions whereby the sulphur oxides present in the gas are sorbed by said cerium oxide sorbent and regenerating said cerium oxide sorbent by contacting with a reducing atmosphere at conditions whereby the sorbent is substantially converted to a sulfur-free state. The gas may be an exhaust gas, e.g. from an automobile or a flue gas. This invention is especially preferred for treating flue gas. In this preferred embodiment, the flue gas may be contacted with the cerium oxide sorbent at a temperature of from 300° to 800° C. to form cerium sulfate and/or sulfite and the sorbent is regenerated by contacting with a reducing gas, for example, hydrogen in admixture with steam or other inert gases at a temperature of from 500° to 800° C. to convert the cerium sulfate or sulfite to cerium oxide. During the regeneration step, the desorbed species is initially sulfur dioxide. However, when about 50% of the sulfur is removed from the sorbent, the desorbed species becomes $H_2S$. Thus, the instant invention provides $SO_2$ and $H_2S$ in admixture with the excess reducing gas, which can be fed conveniently to the Claus plant for conversion into elemental sulfur.

7 Claims, 3 Drawing Figures

PROCESS FOR THE DESULFURIZATION OF FLUE GAS

FIELD OF THE INVENTION

The instant invention relates to a process for the removal of sulfur dioxide from flue gas which comprises the steps of contacting flue gas with a cerium oxide sorbent at conditions whereby the sulfur dioxide present in the flue gas is sorbed by said cerium oxide and regenerating said cerium oxide sorbent by contacting with a reducing gas at conditions whereby the catalyst is substantially converted to a sulfur-free state. More particularly, the flue gas is contacted with the sorbent at a temperature of from 300°C. to 800°C. to form cerium sulfate or sulfite and the sorbent is regenerated by contacting with a reducing gas, for example, hydrogen, at a temperature of from 500°C. to 800°C. to regenerate the catalyst by conversion of the cerium sulfate and/or sulfite to cerium oxide. During the regeneration step, the regeneration gas is initially sulfur dioxide. When about 50% of the sulfur is removed from the catalyst, the regeneration gas comprises $H_2S$. Thus, the instant invention provides a mixture of $SO_2$ and $H_2S$ in the regeneration gas, which can be used conveniently in the Claus plant for making elemental sulfur.

BACKGROUND OF THE PRIOR ART

It has become more important to use fuels which are high in sulfur content due to the storage of relative low sulfur oil feedstocks. For example, the electrical power generating industry is turning toward coal, a known high-sulfur fuel as a feedstock. Because of the increased use of these high sulfur feedstocks, it has become more important to develop means for removing the sulfur present in the fuel. One approach has been to remove the sulfur from the flue gas obtained by burning the fuel and, thus, abate the pollution problems inherent in the use of high-sulfur fuels.

The current approaches to flue gas desulfurization are of three basic types. For example, the flue gas can be scrubbed with an alkaline scrubber which chemically reacts with $SO_2$ in the flue gas. However, this reaction favors the formation of reaction products which are so strongly combined that there is no economical way to regenerate the starting scrubber material. Another approach has been to use catalysts to oxidize the $SO_2$ in the flue gas to $SO_3$ which may subsequently be used for the production of $H_2SO_4$, for example, see British Patent 945,022, which teaches the preparation of vanadium type catalysts for use in this process. This reference also teaches that cerium oxides can be combined with vanadium in the catalyst used in this oxidation process. Finally, solid or liquid scrubber systems that adsorb or react weakly with $SO_2$ have been used, which can be regenerated thermally or chemically.

A process for removal of $SO_2$ from flue gas is disclosed in U.S. Ser. No. 381,369, herein incorporated by reference, which utilizes a vanadium oxide sorbent, which is subsequently regenerated by desorbing the sulfur with a reducing gas.

Another process which is of this nature utilizes copper oxide as the sorbent. However, during the regeneration of the sorbent under reducing conditions, it is difficult to prevent reduction of the oxide to the metal, which is useless as a sorbent.

In a recent article, "Selection of Metal Oxides for Removing $SO_2$ from Flue Gas" by Lowell et al., Ind. Eng. Chem. Process Des. Develop., Vol. 10, No. 3, 1971, the use of various oxides as sorbents for sulfur dioxide present flue gases is discussed. The authors evaluate 47 different oxides and suggest a group of 15 as the most promising. This group includes cerium oxide but does not discuss its use in detail nor how to regenerate the sorbent. The article suggests that the sorbents should be regenerated thermally and does not discuss the regeneration of said sorbents under reducing conditions because of the authors' feeling that the operating cost of reducing gas was advantageous. It is thus clear that the authors did not recognize the advantage of using cerium oxide as a sorbent for $SO_2$, especially the advantages inherent in the regeneration of the sorbent under reducing conditions to form a mixture of $H_2S$ and $SO_2$ which can be used conveniently as a feedstock for a Claus sulfur plant.

SUMMARY OF THE INVENTION

It has now been unexpectedly discovered that sulfur oxides, e.g. sulfur dioxide and sulfur trioxide can be removed from a gas by a process wherein the gas, containing said sulfur oxides, is contacted with a cerium oxide sorbent at conditions whereby the sulfur oxides are sorbed on the cerium oxide. The spent sorbent is subsequently or continuously regenerated by contacting with a reducing gas at conditions whereby sulfur is removed from the spent sorbent initially as sulfur dioxide and subsequently as $H_2S$.

In the process of the instant invention, a flue gas is contacted with a sorbent comprising cerium oxide in either the +3 or the +4 oxidation state which is preferably supported on an inert support. The support is preferably an inorganic refractory oxide, for example, various aluminas, silica, magnesia, etc. The support can be of various shapes, such as pellets, extrudates, Raschig rings, saddles or monoliths, e.g. honeycombs. The most preferred support is $\gamma$-alumina, especially in the shape of Raschig rings.

The support will have a surface area of from 10 m$^2$/g to 300 m$^2$/g, preferably from 100 m$^2$/g to 200 m$^2$/g. The cerium oxide is combined with the support at from 1 to 40 wt. % of said support. Preferably, the sorbent will comprise from 2 to 20 wt. % cerium oxide. The supported cerium oxide sorbent used in the instant invention may be prepared by methods known in the art for preparing supported catalysts for use in petroleum processes, e.g. reforming, hydrocracking, etc. For example, an aqueous solution of a cerium oxide precursor may be impregnated onto an alumina support. The impregnated support may be subsequently separated from excess solution, dried at a temperature of from about 20° to 110°C., and calcined at a temperature of from about 300° to 600°C. During the drying and/or the calcining step, the supported catalyst may be contacted with air or $O_2$ to convert the impregnated cerium compound into the oxide.

An alternative approach to the preparation of a cerium oxide impregnated support which places the $CeO_2$ on the outer surface of a porous support involves prefilling of the pores with an inert liquid as described in U.S. Pat. No. 2,746,936, herein incorporated by reference.

For convenience, the catalyst is impregnated with an aqueous solution of the cerium oxide precursor. However, organic solvents may be utilized provided the cerium oxide precursor is soluble therein. Precursors of the cerium oxide, which are soluble in aqueous solutions, include ceric ammonium nitrate, cerous nitrate, basic ceric nitrate, cerous acetate, etc.

In the process of the instant invention, a gas which is preferably a flue gas and thus may comprise from 0.1 to 20% by volume sulfur oxides is contacted with the sorbent described above. Additionally, the flue gas may comprise $O_2$, $N_2$, $CO_2$, CO, $H_2O$, NO, $NO_2$, etc. It should be noted that none of these additional components of flue gas will interfere with the process of the instant invention. During the initial contacting step, the temperature is maintained at from 300°C. to 800°C., preferably from 500°C. to 600°C. The pressure is not critical. For convenience, whatever pressure is obtained at the flow and temperatures utilized will be acceptable. The flow of the flue gas through the initial contacting zone i.e., the zone in which the sorbent is contained, may vary from 100 to 30,000, preferably from 1,000 to 10,000 GHSV. In the initial contacting zone, the catalyst may be present in the form of pellets, extrudates, etc. After a certain time, depending on the above contacting conditions, the cerium oxide will be converted substantially to cerium sulfate and/or sulfite which is ineffective for sorbing sulfur oxides. In a preferred embodimemt of the process of the instant invention, when the conversion of cerium oxide to sulfate reaches from 30 to 70 percent of capacity, the sorbent is regenerated. Regeneration may take place in a separate regeneration zone to which the spent sorbent has been moved by means known in the art. The spent sorbent in which the cerium is present substantially as cerium sulfate and/or sulfite is contacted with a reducing gas, for example, hydrogen, at a temperature of from 500° to 700°C. The hydrogen is preferably present in admixture with an inert gas, e.g., $H_2O$, $N_2$, A, etc. The composition of the inert gas will be adjusted by the skilled artisan to obtain most economical use of the $H_2$. For example, a 15 volume % $H_2O$ may be used. During this contacting, the cerium sulfate is converted substantially to cerium oxide while the sulfur is removed as sulfur dioxide from the sorbent. After approximately 50% of the sulfur has been removed, a rather remarkable phenomenon is observed. The majority of the desorbed sulfur species becomes $H_2S$. While not intending to be bound by theory, it is felt that when $CeO_2$ occupies a significant fraction of the surface, the rapid reduction of sulfate to sulfide is catalyzed. This unexpected result provides a mixture of a regeneration gas consisting of sulfur dioxide and $H_2S$, which can be conveniently used in a Claus plant for conversion to sulfur.

In the Claus plant, sulfur compounds present in a gas stream are converted into elemental sulfur. If the stream is net reducing, air is added to adjust the $H_2S/SO_2$ ratio to 2. If the stream is net oxidizing, a reducing gas is added to give the same optimum ratio of $2H_2S:1SO_2$.

The regeneration gas from the process of the instant invention contains approximately a 1:1 molar ratio of $H_2S$ and $SO_2$. Thus this gas may be conveniently combined with 1 mole of $H_2S$ which may be available from desulfurization of petroleum feeds and used directly as the feed for the Claus plant.

A preferred embodiment of the instant invention utilizes a multibed unit, wherein a gas mixture containing sulfur oxides is passed through one or more fixed beds of supported cerium oxide. While these beds are scrubbing sulfur oxides, the other beds of the unit are being regenerated with a reducing gas. The roles of the scrubber and regenerator are reversed when both have completed their task.

In another embodiment of the instant invention, the catalyst is continuously removed and regenerated. For example, see the apparatus described in U.S. Ser. No. 381,369, herein incorporated by reference.

As stated above, the cerium oxide is preferably supported on an inert support material to most economically use the cerium oxide. However, unsupported cerium oxide may be used in the process of the instant invention, provided adequate surface areas are obtained. Preferably the unsupported cerium oxide should have a surface area of at least 10 $m^2/g$, preferably from 20 $m^2/g$ to 40 $m^2/g$. A preferred method for obtaining surface areas in these ranges is given below. The following are preferred embodiments of the instant invention.

EXAMPLE 1

This experiment shows the use of an unsupported cerium oxide sorbent. The sorbent was prepared by thermal decomposition of $(NH_4)_2Ce(NO_3)_6$ at 300°C in air. This unsupported catalyst had the cubic cerium dioxide structure and a suface area of from 10 to 20 $m^2/g$, as determined by the Brunauer-Emmett-Teller (BET) method. This catalyst was contacted with a simulated flue gas comprising 3000 ppm $SO_2$, 3–4% oxygen and the balance nitrogen. The contacting was begun at room temperature and continuously increased to at least 500°C. The absorption of $SO_2$ became very rapid at temperatures above 500°C. After 50–70 mole % of the cerium dioxide was converted to cerium sulfate, a regeneration gas was substituted for the flue gas. This regeneration gas consisted of 15 volume % hydrogen in argon. The regeneration was found to be very rapid between the temperatures of 500° and 600°C. This cycle was repeated six times. During the subsequent cycles, 50–75 mole % of the oxide was converted to the sulfate. See FIG. 1 for this experiment in which an electrobalance was used to continuously follow weight change at 600°C. It should be noted that 10.20 mg. of the sorbent was used in this run. The results of this series of experiment establishes that cerium oxide is a regenerable sulfur oxide scrubber.

EXAMPLE 2

Figure 2:
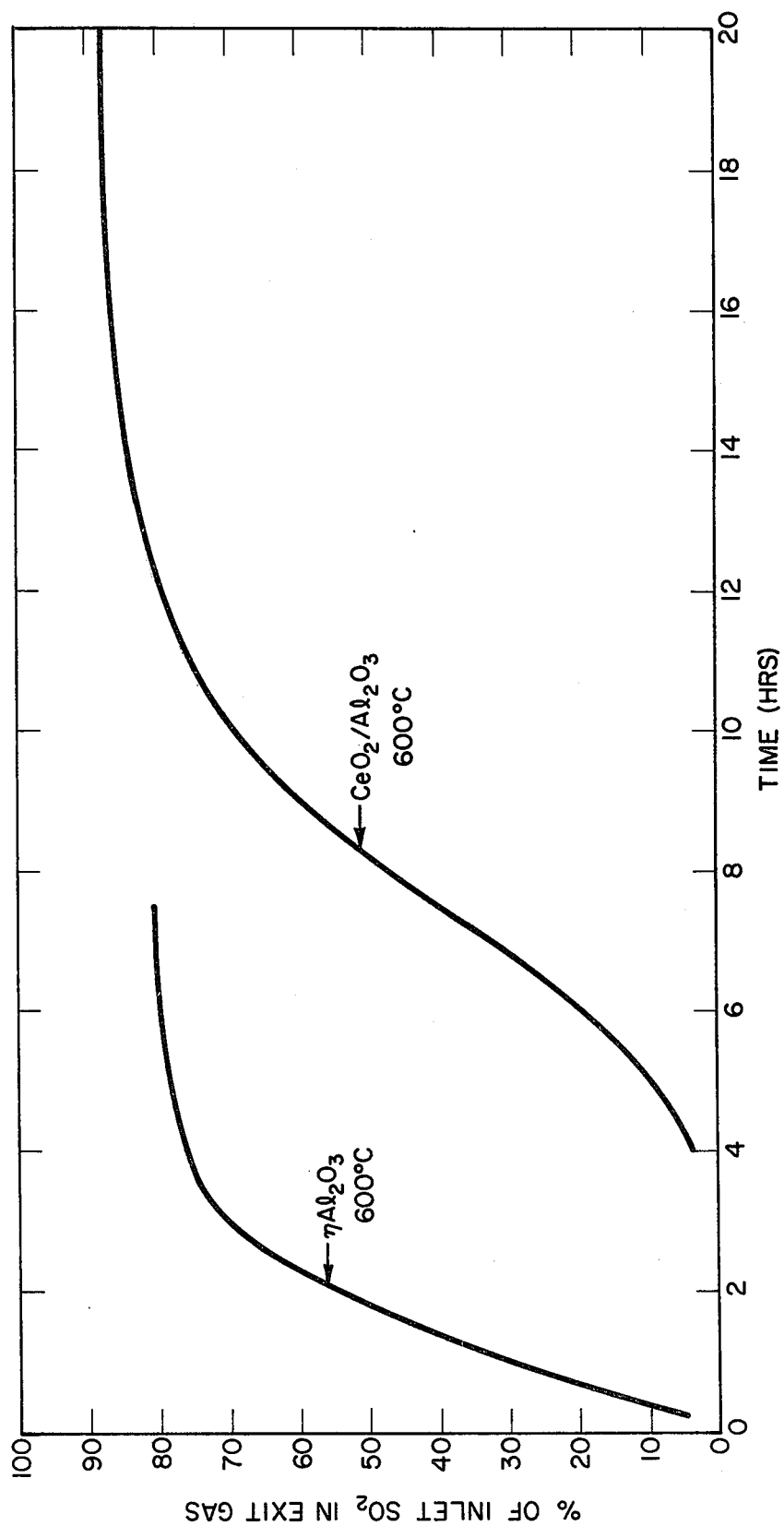

In this experiment, cerium dioxide was supported on alumina extrudates (⅛ × ¼ long). The catalyst was prepared by impregnating alumina with a solution of ceric ammonium nitrate to give 20 wt. % $CeO_2$. The ratio of the solution and the alumina was adjusted so that the solution just wetted the support, i.e. the solution was completely absorbed. The samples were dried at 100°C. and calcined at temperatures up to 600°C. The catalyst was analyzed for cerium by X-ray fluorescence and found to contain 20 wt. % cerium dioxide on alumina. The catalyst was used in a flow reactor wherein 15 cc of the catalyst was contacted with the simulated flue gas at a space velocity of 1000 V/V/Hr. The contacting took place at 600°C. FIG. 2 shows the average percent input of $SO_2$ in the exit stream as a function of time for a series of sorption/regeneration cycles. The supported cerium oxide sorbent is compared to alumina, alone, to show the effect of the cerium oxide. The supported cerium oxide may be regenerated in a manner similar to the method of Example 1.

This example demonstrates that cerium oxide supported on a carrier can effectively remove $SO_2$ from a flue gas and be regenerated repeatedly. The fixed bed arrangement and flow conditions closely resemble those that would exist under the conditions of application.

EXAMPLE 3

Figure 3:
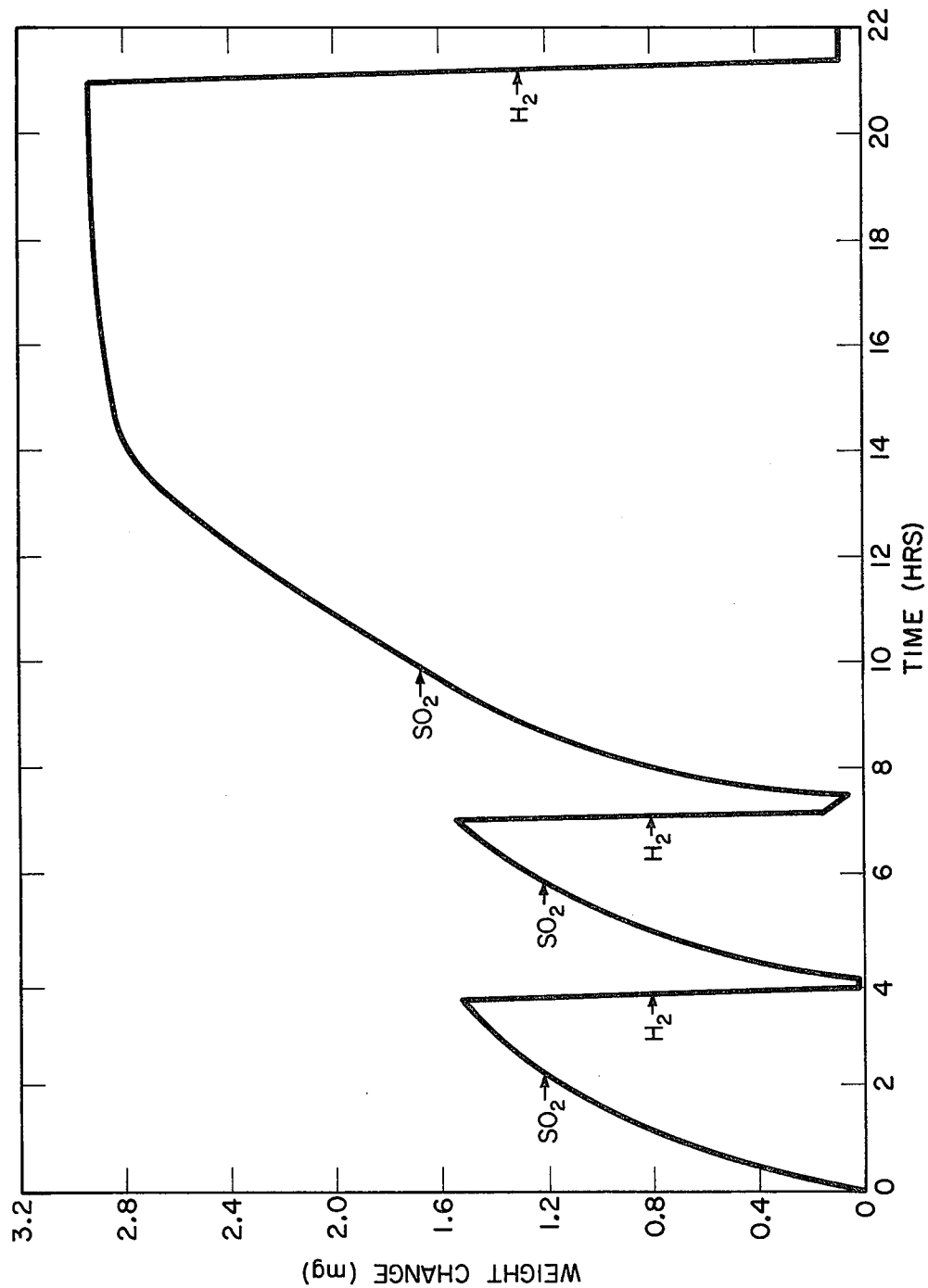

The supported cerium oxide catalyst of Example 2 was examined by TGA to evaluate the extent of $CeO_2$ use. FIG. 3 plots weight changes of a 18.86 mg. sample as recorded from an electrobalance as a function of time on $SO_2$ of $H_2$ and shows that the cerium dioxide supported on alumina absorbs the theoretical 2 moles of $SO_2$ per mole of cerium dioxide at 600°C. It was also noted, that, after complete sulfation of cerium dioxide, (as shown in the third cycle of FIG. 3), the catalyst is still regenerable. Note also that the regeneration step is almost instantaneous relative to the slower rate of $SO_2$ pickup.

It was also noted in this experiment that the composition of the exit gas during the regeneration changed from $SO_2$ to $H_2S$. The exit gas was bubbled through a lead nitrate solution. Initially, a white precipitate was obtained, indicating that lead sulfite had formed. After about 50% of the $SO_2$ had been removed from the cerium dioxide catalyst, the precipitate changed to black, indicating $H_2S$ was coming off the catalyst and forming lead sulfide in the lead nitrate solution. Thus, an equimolar mixture of $SO_2$ and $H_2S$ which can be subsequently utilized as feed for a Claus sulfur plant was obtained during regeneration.

The cerium dioxide sorbent is optimumly used for the removal of sulfur dioxide from flue gas at a temperature of from 500° to 600°C., which is somewhat high for use in existing power plants. However, in newer power plants or existing metallurgical installations where stack gas temperatures are higher, this process is extremely effective. Furthermore, in the most preferred embodiment of the instant invention, the cerium dioxide sorbent is used to remove $SO_2$ from the stack of the Claus plant. In the Claus plant, the last step before the stack is the incineration of $H_2S$, $CS_2$ and COS to $SO_2$. Presently, this gas must be cooled prior to the desulfurization of the flue gas with the existing technology. In the process of the instant invention, the cooling step can be eliminated because of the higher optimum operating temperature for a $CeO_2$ sorbent.

What is claimed is

1. A process for the removal of sulfur oxides from a gas, which comprises the steps of contacting the gas with a cerium oxide sorbent at a temperature of from 300° to 800°C until the cerium oxide sorbs sulfur oxide, and regenerating the spent sorbent by contacting with hydrogen wherein during regeneration the sulfur sorbed cerium is subsequently converted to cerium oxide and the desorbed sulfur specie is initially sulfur dioxide and subsequently hydrogen sulfide.

2. The process of claim 1 wherein said gas is a flue gas.

3. The process of claim 2 wherein said sorbent comprises cerium oxide supported on an inorganic refractory oxide.

4. The process of claim 3 wherein said inorganic refractory oxide is $\gamma$-alumina.

5. The process of claim 3 wherein cerium oxide is combined with said support at from 1 to 40 weight % of said support.

6. The process of claim 2 wherein said flue gas comprises from .01 to 20 weight % sulfur oxides.

7. The process of claim 1 wherein the hydrogen is mixed with an inert component selected from the group consisting of steam and inert gases prior to contacting with the spent sorbent.

* * * * *